(12) United States Patent
Yang et al.

(10) Patent No.: US 11,349,376 B2
(45) Date of Patent: May 31, 2022

(54) ROTOR, ASSEMBLY METHOD AND REPLACEMENT METHOD FOR INTEGRATED MAGNETIC POLE MODULES OF ROTOR, AND GENERATOR

(71) Applicant: BEIJING GOLDWIND SCIENCE & CREATION WINDPOWER EQUIPMENT CO., LTD., Beijing (CN)

(72) Inventors: Jingchao Yang, Beijing (CN); Yanhui Li, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 335 days.

(21) Appl. No.: 16/610,361

(22) PCT Filed: Jan. 3, 2019

(86) PCT No.: PCT/CN2019/070216
§ 371 (c)(1),
(2) Date: Nov. 1, 2019

(87) PCT Pub. No.: WO2020/007020
PCT Pub. Date: Jan. 9, 2020

(65) Prior Publication Data
US 2021/0359578 A1 Nov. 18, 2021

(30) Foreign Application Priority Data
Jul. 4, 2018 (CN) .......................... 201810723393.7

(51) Int. Cl.
*H02K 1/28* (2006.01)
*H02K 1/27* (2022.01)
(Continued)

(52) U.S. Cl.
CPC ....... *H02K 15/0006* (2013.01); *H02K 1/2786* (2013.01); *H02K 1/28* (2013.01); *H02K 7/183* (2013.01); *H02K 2213/12* (2013.01)

(58) Field of Classification Search
CPC .... H02K 15/0006; H02K 1/2786; H02K 1/28; H02K 7/183; H02K 2213/12; H02K 7/1838; H02K 15/03
See application file for complete search history.

(56) References Cited

U.S. PATENT DOCUMENTS

| | | | |
|---|---|---|---|
| 6,628,034 B2 * | 9/2003 | Jang | H02K 21/16 310/210 |
| 2012/0169171 A1 | 7/2012 | Jansen | |

(Continued)

FOREIGN PATENT DOCUMENTS

| | | |
|---|---|---|
| EP | 1777795 A2 | 6/2006 |
| EP | 2523316 A1 | 5/2011 |
| KR | 20160059941 A | 5/2016 |

OTHER PUBLICATIONS

European Search Report Applcation No. 19756089.9; dated Jan. 7, 2020.

*Primary Examiner* — Thomas Truong (57) ABSTRACT

The present application relates to a rotor, an assembly method and a replacement method for integrated magnetic pole modules of rotor, and a generator. The rotor includes: a rotor yoke having a mounting surface and an outer peripheral surface which are opposite to each other in a radial direction; multiple beads, which are distributed and spaced apart on the mounting surface along a circumferential direction of the rotor yoke, in which a radial distance between each bead and the mounting surface is adjustable; multiple integrated magnetic pole modules, each of which is detachably connected between two adjacent beads, and includes a carrier plate and multiple permanent magnets (Continued)

arranged on the carrier plate; and multiple fixing members, in which each of the beads is mounted to the mounting surface by the fixing members, and each of the fixing members has an operation portion that can protrude from the outer peripheral surface.

11 Claims, 6 Drawing Sheets

(51) Int. Cl.
*H02K 15/00* (2006.01)
*H02K 1/2786* (2022.01)
*H02K 7/18* (2006.01)

(56) References Cited

U.S. PATENT DOCUMENTS

2016/0164355 A1* 6/2016 Diaz Diaz ................ H02K 3/12
310/156.54
2018/0287438 A1* 10/2018 Muniz Casais .......... H02K 1/27

\* cited by examiner

| |
|---|
| the multiple beads 20 are arranged and spaced apart on the mounting surface 1 along the circumferential direction of the rotor yoke 10, and the radial distance between each bead 20 and the mounting surface 1 is adjusted to a predetermined distance H by support members 50, so that every two adjacent beads 20 and the mounting surface 1 together form a mounting space — S10 |
| each integrated magnetic pole module 30 is placed into a predetermined position in the mounting space, and the carrier plate 31 is attached and fixed to the mounting surface 1 — S20 |
| the fixing members 40 are adjusted so that the radial distance between each bead 20 and the mounting surface 1 is maintained at the predetermined distance H — S30 |
| the support members 50 are removed — S40 |
| the fixing members 40 are adjusted to fix the beads 20 to the mounting surface 1 and allow the operation portions 41 of the fixing members 40 to protrude from the outer peripheral surface 2 — S50 |

| | |
|---|---|
| the operation portions 41 of the fixing members 40 located on two sides of the integrated magnetic pole module 30A to be replaced are adjusted from the side of the rotor yoke 10 where the outer peripheral surface 2 is located, so that the radial distance between the beads 20 on two sides of the integrated magnetic pole module 30A to be replaced and the mounting surface 1 is adjustable | S100 |
| the radial distance between the beads 20 and the mounting surface 1 is adjusted from the side where the outer peripheral surface 2 is located by the support members 50 to the predetermined distance H | S200 |
| the integrated magnetic pole module 30A to be replaced is taken out of the mounting space formed by the beads 20 and the mounting surface 1 | S300 |
| a spare integrated magnetic pole module 30B is placed at the predetermined position in the mounting space, such that the carrier plate 31 is attached and fixed to the mounting surface 1 | S400 |
| the support members 50 are removed | S500 |
| the operation portions 41 of the fixing members 40 are adjusted to fix the beads 20 to the mounting surface 1 and allow the operation portions 41 to protrude from the outer peripheral surface 2 | S600 |

Figure 12 ic # ROTOR, ASSEMBLY METHOD AND REPLACEMENT METHOD FOR INTEGRATED MAGNETIC POLE MODULES OF ROTOR, AND GENERATOR

CROSS-REFERENCE TO RELATED APPLICATIONS

The present application is a National Phase entry of PCT Application No. PCT/CN2019/070216, filed on Jan. 3, 2019; which claims priority to Chinese Patent Application No. 201810723393.7, title "ROTOR, ASSEMBLY METHOD AND REPLACEMENT METHOD FOR INTEGRATED MAGNETIC POLE MODULES OF ROTOR, AND GENERATOR" filed on Jul. 4, 2018 with China National Intellectual Property Administration, which are incorporated herein by reference in their entireties.

FIELD

The present application relates to the field of wind power generation technology, and in particular, to a rotor, an assembly method and a replacement method for integrated magnetic pole modules of rotor, and a generator.

BACKGROUND

A direct-drive permanent magnet generator generally has a structure including a rotor and a stator which is mounted inside the rotor. The rotor includes a rotor yoke and magnetized permanent magnets which are fixed onto the rotor yoke for magnetizing.

In a large generator such as a wind turbine generator set, the rotor generally provides an alternating magnetic field by multiple columns of integrated magnetic pole modules, and each column of the integrated magnetic pole modules is composed of multiple permanent magnets or multiple magnetic pole modules. The permanent magnets or magnetic pole modules are assembled onto the rotor yoke one by one by repeating a same assembly process, and the assembly process is complicated.

In addition, an air gap formed between the rotor and the stator is usually measured in millimeters. Once a permanent magnet or a magnetic pole module is damaged, it is very difficult to remove and replace the damaged permanent magnet or magnetic pole module in the millimeter air gap, so the generator has to be hoisted down from the tower. Considering the costs of subsequent transportation, production, and secondary hoisting, the maintenance costs are very expensive.

SUMMARY

An object of the embodiments of the present application is to provide a rotor and a generator, by which the integrated magnetic pole modules can be entirely replaced without disassembling the rotor and the stator of the generator, thereby reducing the maintenance costs of the rotor of the generator.

Another object of the embodiments of the present application is to provide an assembly method and a replacement method for integrated magnetic pole modules of rotor, which can improve the assembly efficiency and replacement efficiency of the rotor of the generator.

A rotor, according to an embodiment of the present application, is arranged around an outer peripheral surface of a stator of the generator, and the rotor includes: a rotor yoke having a mounting surface and an outer peripheral surface which are opposite to each other in a radial direction; multiple heads, which are distributed spaced apart and on the mounting surface along a circumferential direction of the rotor yoke, where a radial distance between each bead and the mounting surface is adjustable; multiple integrated magnetic pole modules, each of which is detachably connected between two adjacent beads, and includes a carrier plate and multiple permanent magnets arranged on the carrier plate, where the carrier plate is attached to the mounting surface; and multiple fixing members, where each of the beads is mounted to the mounting surface by the fixing members, and each of the fixing members has an operation portion that can protrude from the outer peripheral surface.

An assembly method for integrated magnetic pole modules of a rotor as described above according to an embodiment of the present application, includes: arranging the multiple beads spaced apart and on the mounting surface along the circumferential direction of the rotor yoke, and adjusting the radial distance between each bead and the mounting surface to a predetermined distance by support members, so that every two adjacent beads and the mounting surface together form a mounting space; placing each integrated magnetic pole module into a predetermined position in the mounting space, and attaching and fixing the earlier plate to the mounting surface; adjusting the fixing members so that the radial distance between each bead and the mounting surface is maintained at a predetermined distance; removing the support members; and adjusting the fixing members to fix the beads to the mounting surface and allow the operation portions of the fixing members to protrude from the outer peripheral surface.

According to an embodiment of the present application, a replacement method for integrated magnetic pole modules of a rotor as described above includes: adjusting the operation portions of the fixing members located on two sides of the integrated magnetic pole module to be replaced from the outer peripheral surface side of the rotor yoke, so that the radial distance between the beads on two sides of the integrated magnetic pole module to be replaced and the mounting surface is adjustable; adjusting the radial distance between the beads and the mounting surface from the outer peripheral surface side by the support members to a predetermined distance; taking the integrated magnetic pole module to be replaced out of the mounting space formed by the beads and the mounting surface; inserting a spare integrated magnetic pole module into a predetermined position in the mounting space, and attaching and fixing the carrier plate to the mounting surface; removing the support members; and adjusting the operation portions of the fixing members to fix the beads to the mounting surface and allow the operation portions to protrude from the outer peripheral surface.

A generator according to an embodiment of the present application includes: a stator; and a rotor which is arranged around an outer peripheral surface of the stator and is the rotor as described above.

According to the rotor and the generator provided by the embodiments of the present application, one integrated magnetic pole module can be formed by arranging multiple permanent magnets together on one carrier plate, which allows to assemble or disassemble the multiple permanent magnets as a whole; besides, by providing fixing members having operation portions, the fixing members can be loosened from the outer peripheral surface side of the rotor yoke without disassembling the rotor and the stator of the generator, and the radial distance between the beads and the mounting surface can be adjusted. Therefore, when a certain permanent magnet is damaged, the entire integrated magnetic pole module can be taken out and replaced, which reduces the maintenance costs of the rotor of the generator. In addition, the assembly method and the replacement method for integrated magnetic pole modules of rotor provided by the embodiments of the present application improve the assembly efficiency and the replacement efficiency of the rotor of the generator.

BRIEF DESCRIPTION OF THE DRAWINGS

The present application can be better understood from the following detailed description of embodiments of the present application in conjunction with the drawings.

Other characteristics, objectives and advantages of the present application will become more apparent after reading the detailed description of non-restricted embodiments in conjunction with the drawings. Identical or similar reference numerals indicate identical or similar features.

REFERENCE NUMERALS IN THE DRAWINGS

10 rotor yoke; 1 mounting surface; 2 outer peripheral surface; 3 first end; 4 second end; 11 first through hole; 12 first process through hole; 13 annular projection; 14 threaded hole for fixing;

20 bead; 21 second through hole; 22 second process through hole; 23 socket portion;

30 integrated magnetic pole module; 30A integrated magnetic pole module to be replaced; 30B spare integrated magnetic pole module; 31 carrier plate; 311 through hole; 312 plug portion; 32 permanent magnet;

40 fixing member; 41 operation portion; 42 nut; 50 support member; 60 fastener.

DETAILED DESCRIPTION OF THE EMBODIMENTS

Characteristics and exemplary embodiments of the present application are described in detail hereafter. Specific details are provided in the following description for a thorough understanding of the present application. It is obvious for those skilled in the art that the present application can be implemented without some of the specific details. The description of the exemplary embodiments is only to provide a better understanding of the present disclosure. The present application is in no way limited to any specific configuration or algorithm presented below, but covers any modification, substitution and improvement of elements, components and algorithms without departing from the spirit of the present application. In the drawings and the following description, well-known structures and techniques are not shown in order to avoid unnecessarily obscuring the present application.

Exemplary embodiments are described in more detail with reference to the drawings. However, the exemplary embodiments can be embodied in many forms and should not be construed as being limited to the embodiments set forth herein; on the contrary, these embodiments are provided so that this present application can be more comprehensive and complete, and the concept of these embodiments can be fully conveyed to those skilled in the art. In the drawings, thickness of the regions and layers may be exaggerated for clarity. Identical reference numerals indicate identical or similar structures and detailed description thereof are omitted.

Figure 1:
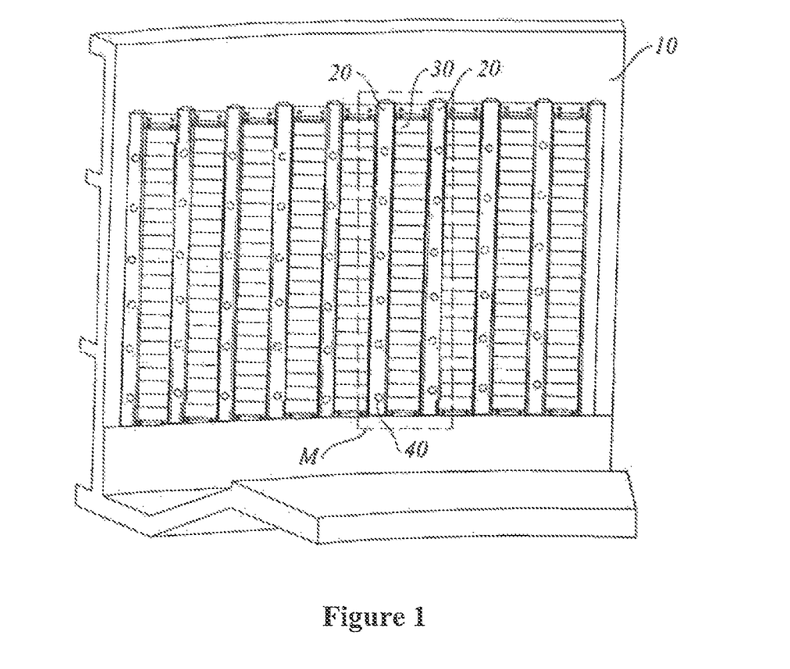
FIG. 1 is a schematic partial structural view of a rotor of a generator taken along an axial direction perpendicular to the rotor according to an embodiment of the present application.
Figure 2:
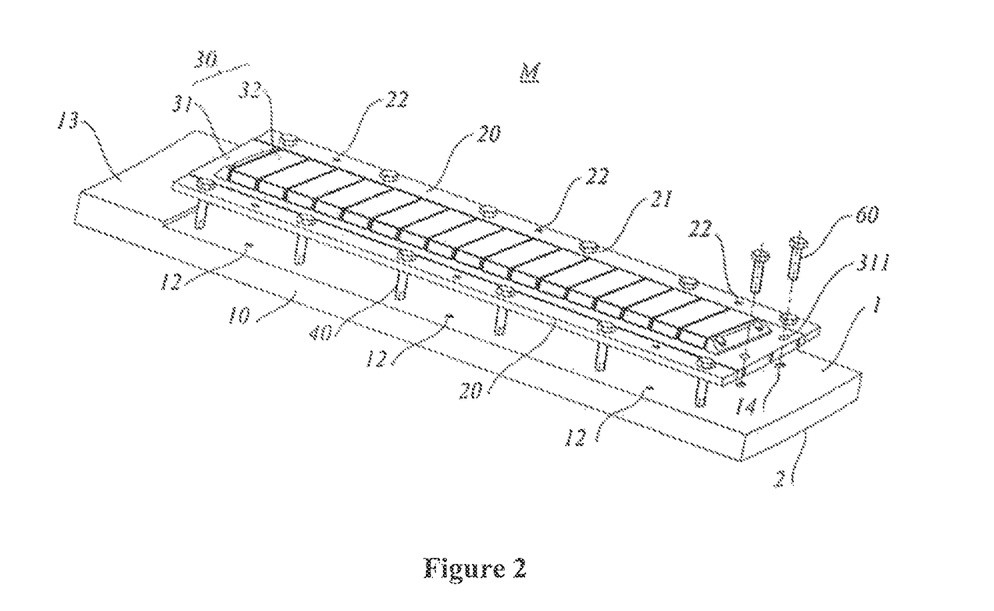
FIG. 2 is a schematic exploded structural view of a portion of the rotor shown in the area M of FIG. 1 taken along a certain angle.
Figure 3:
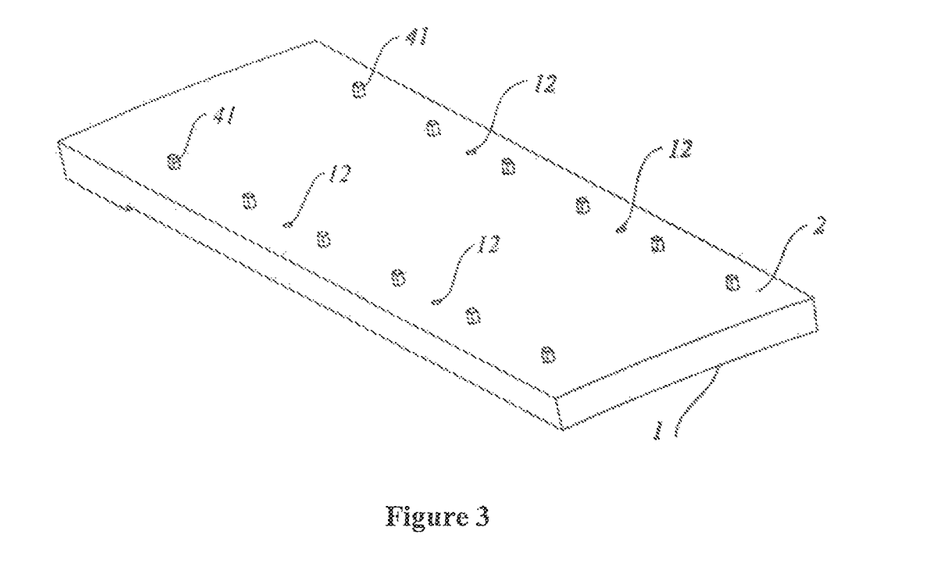
FIG. 3 is a schematic structural view of the portion of the rotor shown in the area M of FIG. 1 taken along another angle.

Referring to FIG. 1 to FIG. 3, a rotor is provided according to an embodiment of the present application, and is arranged around an outer peripheral surface of a stator of a generator The rotor includes: a rotor yoke 10, multiple beads 20, multiple integrated magnetic pole modules 30, and multiple fixing members 40.

The rotor yoke 10 includes a mounting surface 1 and an outer peripheral surface 2 which are arranged opposite to each other in a radial direction.

The multiple beads 20 are distributed and spaced apart on the mounting surface 1 along a circumferential direction of the rotor yoke 10, and a radial distance between each bead 20 and the mounting surface 1 is adjustable.

Each of the multiple integrated magnetic pole modules 30 is detachably connected between two adjacent beads 20, and includes a carrier plate 31 and multiple permanent magnets 32 arranged on the carrier plate 31, and the carrier plate 31 is attached to the mounting surface 1. The multiple permanent magnets 32 are arranged on one carrier plate 31 to form one integrated magnetic pole module 30 for facilitating assembly or disassembly of the integrated magnetic pole module 30 as a whole.

Each of the beadings 20 is mounted on the mounting surface 1 by the fixing members 40, and each of the fixing members 40 has an operation portion 41 protruding through the outer peripheral surface 2. The operation portion 41 of the fixing member 40 can be clamped by an operation means, that is, the fixing member 40 can be loosened or fastened on a side of the rotor yoke 10 where the outer peripheral surface 2 is located, so that the radial distance between the bead 20 and the mounting surface 1 is adjustable.

According to the rotor provided by the embodiments of the present application, one integrated magnetic pole module 30 can be formed by arranging multiple permanent magnets 32 together on one carrier plate 31, which allows assembling or disassembling the multiple permanent magnets as a whole. In addition, by providing fixing members 40 having operation portions 41, the fixing members 40 can be loosened or fastened from the side of the rotor yoke 10 where the outer peripheral surface 2 is located without disassembling the rotor and the stator of the generator, so that the radial distance between the beads 20 and the mounting surface 1 is adjustable. Therefore, when a certain permanent magnet 32 is damaged, the entire integrated magnetic pole module 30 can be taken out and replaced, which reduces the maintenance costs of the rotor of the generator.

The specific structure of the rotor provided by the embodiments of the present application is described in detail below with reference to the accompanying drawings.

Figure 4:
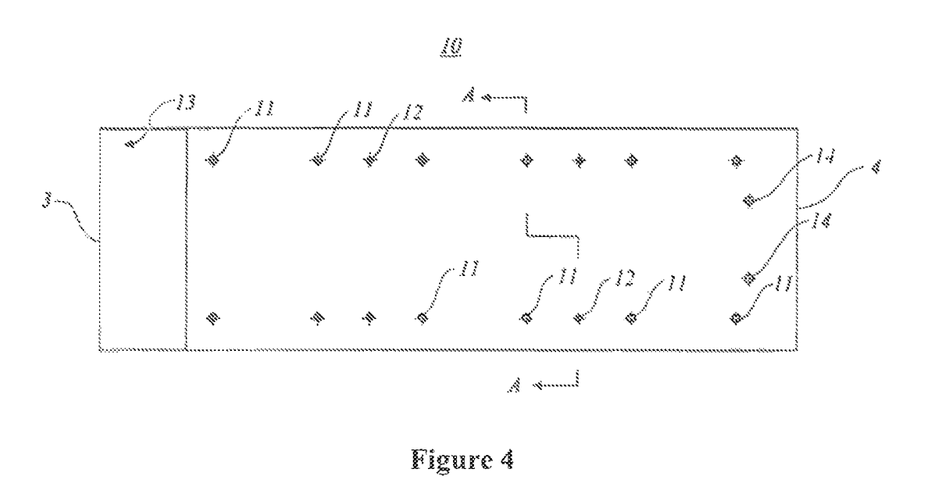
FIG. 4 is a top view of a rotor yoke of the rotor shown in FIG. 2.
Figure 5:
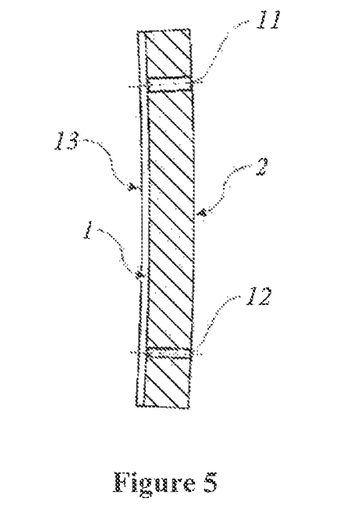
FIG. 5 is a schematic sectional view taken along line A-A of FIG. 4.

Referring to FIG. 4 and FIG. 5, the rotor yoke 10 is provided with multiple first through holes 11 arranged in rows and columns, and the multiple beads 20 are arranged in rows on the mounting surface 1 of the rotor yoke 10, so that each of the beads 20 is arranged corresponding to a row of the first through holes 11; besides, each of the beads 20 is provided with multiple second through holes 21 in a length extension direction thereof, and at least a portion of the first through holes 11 corresponds to at least a portion of the second through holes 21.

The number of the first through holes 11 may be more than the number of the second through holes 21. In a case that the number of the second through holes 21 on each of the beadings 20 is the same as the number of rows of the first through holes 11 on the rotor yoke 10, the second through holes 21 at a same position on the multiple headings 20 correspond to a row of first through holes 11 of the rotor yoke 10. In a case that the number of the beads 20 is the same as the number of columns of the first through holes 11 on the rotor yoke 10, the first through holes 11 of the rotor yoke 10 are in one-to-one correspondence with the second through holes 21 of the beads 20.

The fixing members 40 include multiple rods, and the operation portion 41 of each rod can pass through the opposite first through hole 11 and second through hole 21, and has at least two different engaging portions in the radial direction, so that the bead 20 can be engaged at least on the two engaging portions with respect to the mounting surface 1.

Specifically, in a case that the bead 20 is engaged on one of the engaging portions of the rod with respect to the mounting surface 1, a radial distance between the bead 20 and the mounting surface 1 is maintained at a predetermined distance; and in a case that the bead 20 is engaged on the other engaging portion of the rod with respect to the mounting surface 1, the bead 20 is fixed to the mounting surface 1. Obviously, more than two engaging portions can be provided on the rod of the operation portion 41 in accordance with the needs for adjusting distances due to different radial distances.

As an optional embodiment, the rods are all bolts, one engaging portion is a nut, and the other engaging portion is provided with an external thread. In order to fasten the head 20 to the rotor yoke, the second through holes 21 on the bead 20 are smooth through holes, and second process through holes 22 are threaded through holes.

In order to maintain the radial distance between the bead 20 and the mounting surface 1 at the predetermined distance, the rotor yoke 10 is further provided with multiple first process through holes 12 distributed in at least one column, and each bead 20 is provided with second process through holes 22 corresponding to one column of the first process through holes 12, The radial distance between each bead 20 and the mounting surface 1 can be adjusted via the first process through holes 12 and the second process through holes 22.

In a case that the number of one second process through hole 22 on each bead 20 is provided, the multiple first process through holes 12 on the rotor yoke 10 are arranged in a column; and in a case that multiple second process through holes 22 on each bead 20 is provided, the multiple first process through holes 12 on the rotor yoke 10 are arranged in rows and columns, and each column of the first process through holes 12 and each column of the first through holes 11 are located in a same column, and one first process through hole 12 may be arranged between two adjacent first through holes 11, as shown in FIG. 4.

Further, the first through holes 11 and the first process through holes 12 on the rotor yoke 10 are threaded through holes, as shown in FIG. 5. Since the second process through hole 22 and the first process through hole 12 are threaded through holes, a support member having an external thread may be provided to sequentially pass through the opposite second process through hole 22 and first process through hole 12 from a side of the rotor yoke 10 where the mounting surface 1 is located, or to sequentially pass through the opposite first process through hole 12 and second process through hole 22 from a side of the rotor yoke 10 where the outer peripheral surface 2 is located. The radial distance between the bead 20 and the mounting surface 1 is maintained at a predetermined distance by engagement of the internal thread and the external thread.

In a case that the support member sequentially pass through the opposite second process through hole 22 and first process through hole 12 from the side of the rotor yoke 10 where the mounting surface 1 is located, the fixing member 40 such as a bolt passes through the opposite second through hole 21 and first through hole 11, and is connected between the bead 20 and the mounting surface 1, and the predetermined distance can be kept therebetween by adjusting a tightening height of the bolt. The predetermined distance and two adjacent beads 20 together form a mounting space, which facilitates assembling the integrated magnetic pole module 30 to the rotor yoke 10 through the mounting space. After the support member is removed, the tightening height of the bolt is continuously adjusted until the bead 20 is fixed to the mounting surface 1 and the operation portion 41 of the bolt protrudes from the side where the outer peripheral surface 2 is located.

After the rotor of the generator is integrated with the stator, the bead 20 can be released front the mounting surface 1 from the side of the rotor yoke 10 where the outer peripheral surface 2 is located when the operation portion 41 is reversely rotated, so that the radial distance between the bead 20 and the mounting surface 1 is adjustable. The support member sequentially passes through the opposite first process through hole 12 and the second process through hole 22 from the side of the rotor yoke 10 where the outer peripheral surface 2 is located, which keeps the bead 20 and the mounting surface 1 at the predetermined distance again, thereby facilitating taking out and replacing the integrated magnetic pole module 30 from the mounting space formed by both the predetermined distance and two adjacent beads 20. After the replacement is completed, the support member is removed, and the tightening height of the bolt is continuously adjusted to fix the bead 20 onto the mounting surface 1.

Taking a large generator of a wind turbine generator set as an example, if one of the permanent magnets 32. of the integrated magnetic pole module 30 fails, there is no need to hoist the generator down from the tower, no need to disassemble the rotor and the stator of the generator, and no need to replace the failed permanent magnet 32 after other adjacent permanent magnets 32 are removed one by one; and it only needs one maintenance worker to climb to the tower and replace the integrated magnetic pole module 30, to which the failed permanent magnet 32 belongs, as a whole without disassembling the rotor and the stator of the generator, which greatly improves the replacement efficiency of the permanent magnet 32 and reduces the maintenance costs of the rotor of the generator.

In addition, the rotor yoke 10 has two opposite ends, a first end 3 and a second end 4, in the axial direction, the first end 3 is provided with an annular projection 13 formed on the mounting surface 1, and the second end 4 is provided with a threaded hole 14 for fixing. Two threaded holes 14 for fixing may be provided, as shown in FIG. 4.

One end of the carrier plate 31 of the integrated magnetic pole module 30 abuts against the annular projection 13, and the other end thereof is provided with a through hole 311 at a position corresponding to the threaded hole 14 for fixing. A fastener 60 passing through the through hole 311 and the threaded hole 14 for fixing connects the integrated magnetic pole module 30 to the mounting surface 1 in the axial direction. The through hole 311 may be a stepped hole or a smooth hole.

Figure 6:
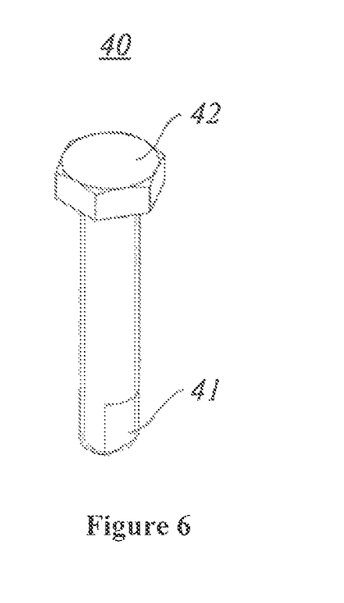
FIG. 6 is a schematic perspective structural view of a fixing member of the rotor shown in FIG. 2.

Referring to FIG. 6, the fixing member 40 is a bolt, and the bolt includes a nut 42 and an operation portion 41. The operation portion 41 is provided with at least one plane parallel to the axial direction of the bolt, preferably provided with two or more planes to facilitate the clamping of an operation means such as a wrench, so that the bolt can be loosened by reversely rotating the operation portion on the side of the rotor yoke 10 where the outer peripheral surface 2 is located, and the radial distance between the bead 20 and the mounting surface 1 can be adjusted.

Figure 7:
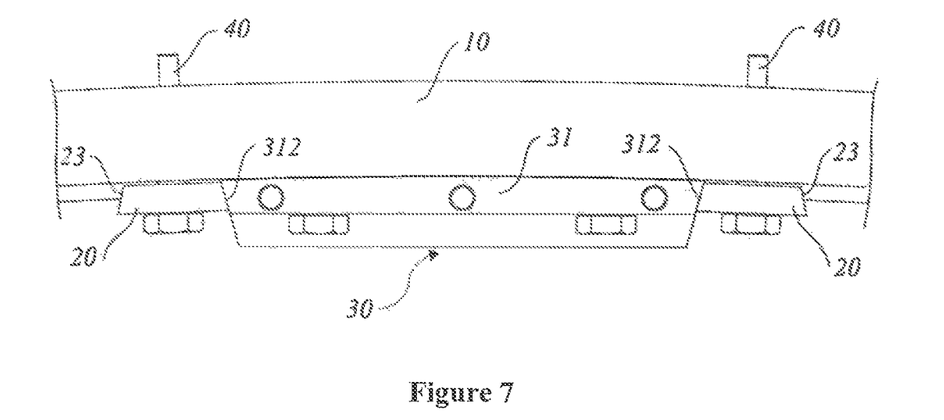
FIG. 7 is a schematic view showing the assembly effect of an integrated magnetic pole module and beads of the rotor shown in FIG. 2.

Referring to FIG. 7, the bead 20 is provided with socket portions 23 on two sides of its width, the carrier plate 31 of the integrated magnetic pole module 30 is provided with plug portions 312 on two sides of its width, and the integrated magnetic pole module 30 is detachably connected between two adjacent beads 20 by the overlap and engagement between the plug portions 312 on the two sides of the carrier plate 31 and the socket portions 23 of the beads 20.

Specifically, each of the socket portions 23 includes a first inclined surface arranged along a width direction of the bead 20 itself, each of the plug portions 312 includes a second inclined surface arranged along a width direction of the carrier plate 31 itself, and the first inclined surface and the second inclined surface can overlap and engage with each other, such that the integrated magnetic pole module 30 can be detachably connected between two adjacent beads 20.

Therefore, after the predetermined distance between the beads 20 and the mounting surface 1 and the two adjacent beads 20 together form the mounting space, the integrated magnetic pole module 30 is placed in the mounting space along the axial direction of the rotor yoke 10, and the radial distance between the beads 20 and the mounting surface 1 is adjusted, so that the socket portions 23 of the beads 20 and the plug portions 312 of the carrier plate 31 overlap and engage with each other to fix the integrated magnetic pole module 30 onto the mounting surface 1 of the rotor yoke 10.

Figure 8:
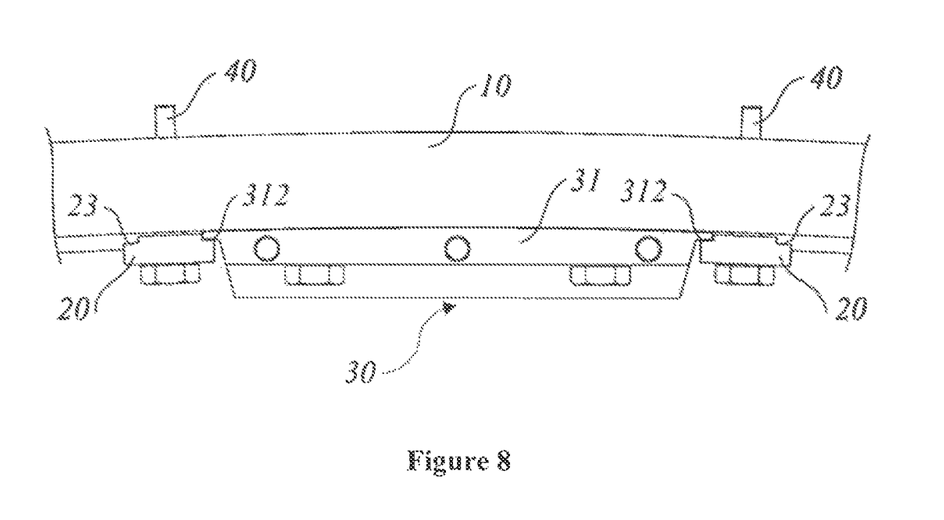
FIG. 8 is a schematic view showing another assembly effect of an integrated magnetic pole module and beads of the rotor according to an embodiment of the present application.

Referring to FIG. 8, another rotor provided by another embodiment of the present application is similar to the rotor structure shown in FIG. 7, and the differences lie in the structures of the socket portion 23 of the bead 20 and the plug portion 312 of the carrier plate 31.

Specifically, a cross section of the socket portion 23 in the width direction of the bead 20 itself is a first step, a cross section of the plug portion 312 in the width direction of the carrier plate 31 itself is a second step, and the first step and the second step can overlap and engage with each other, such that the integrated magnetic pole module 30 can be detachably connected between two adjacent beads 20.

Figure 9:
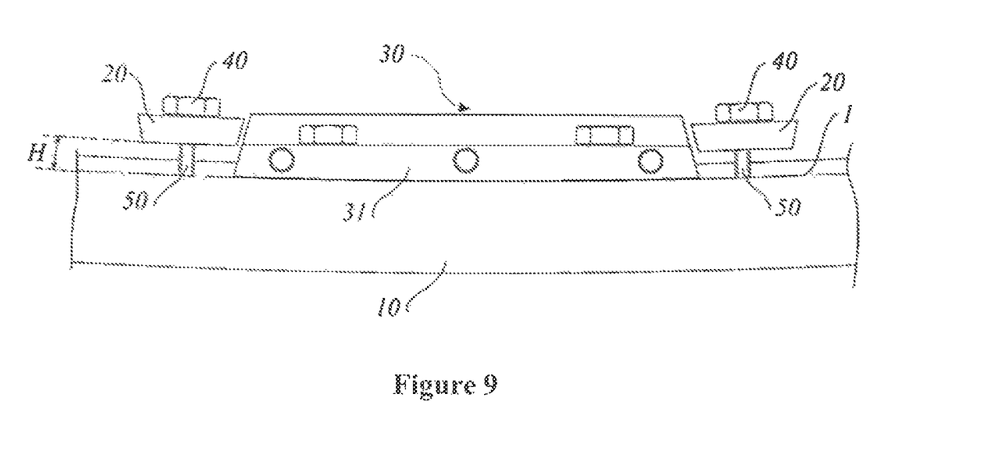
FIG. 9 is a schematic view showing the assembly process of the integrated magnetic pole module of the rotor shown in FIG. 2.
Figure 10:
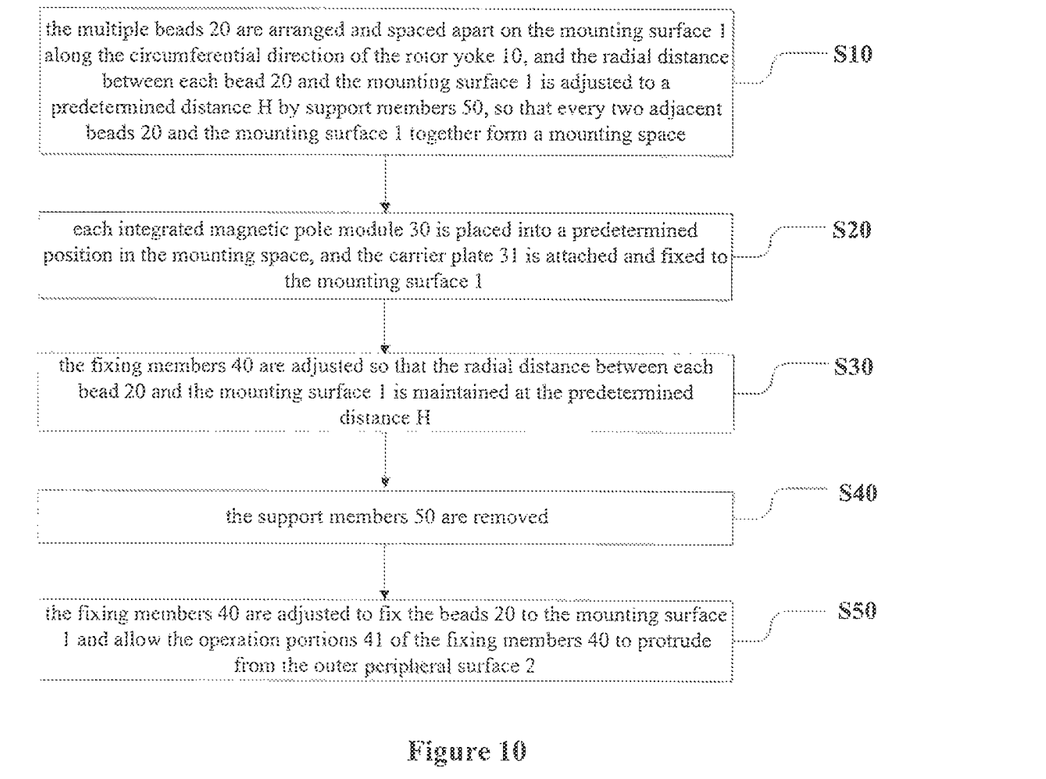
FIG. 10 is a flow chart of an assembly method for integrated magnetic pole modules of a rotor according to an embodiment of the present application.

Referring to FIG. 9 and FIG. 10, according to an embodiment of the present application, an assembly method for integrated magnetic pole modules of a rotor as described above includes the following five steps.

In step S10, the multiple beads 20 are arranged and spaced apart on the mounting surface 1 along the circumferential direction of the rotor yoke 10, and the radial distance between each bead 20 and the mounting surface 1 is adjusted to a predetermined distance H by support members 50, so that every two adjacent beads 20 and the mounting surface 1 together form a mounting space.

In step S20, each integrated magnetic pole module 30 is placed into a predetermined position in the mounting space, and the carrier plate 31 is attached and fixed to the mounting surface 1.

In step S30, the fixing members 40 are adjusted so that the radial distance between each bead 20 and the mounting surface 1 is maintained at the predetermined distance H;

In step S40, the support members 50 are removed.

In step S50, the fixing members 40 are adjusted to fix the beads 20 to the mounting surface 1 and allow the operation portions 41 of the fixing members 40 to protrude from the outer peripheral surface 2.

According to the assembly method for integrated magnetic pole modules of a rotor provided by the embodiment of the present application, one integrated magnetic pole module 30 can be formed by arranging multiple permanent magnets 32 together on one carrier plate 31, which allows to assemble or disassemble the multiple permanent magnets 32 as a whole, avoids repeated installations, and improves the assembly efficiency of the rotor of the generator.

Figure 11:
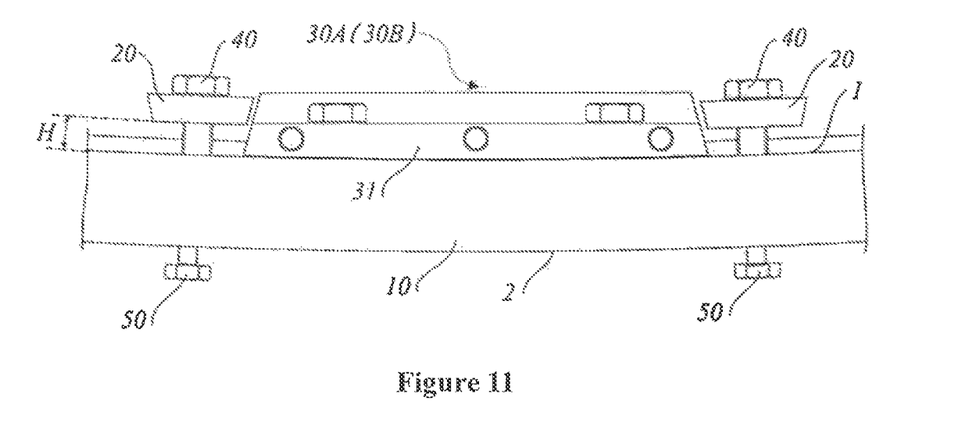
FIG. 11 is a schematic view showing the replacing process of the integrated magnetic pole module of the rotor shown in FIG. 2.
Figure 12:
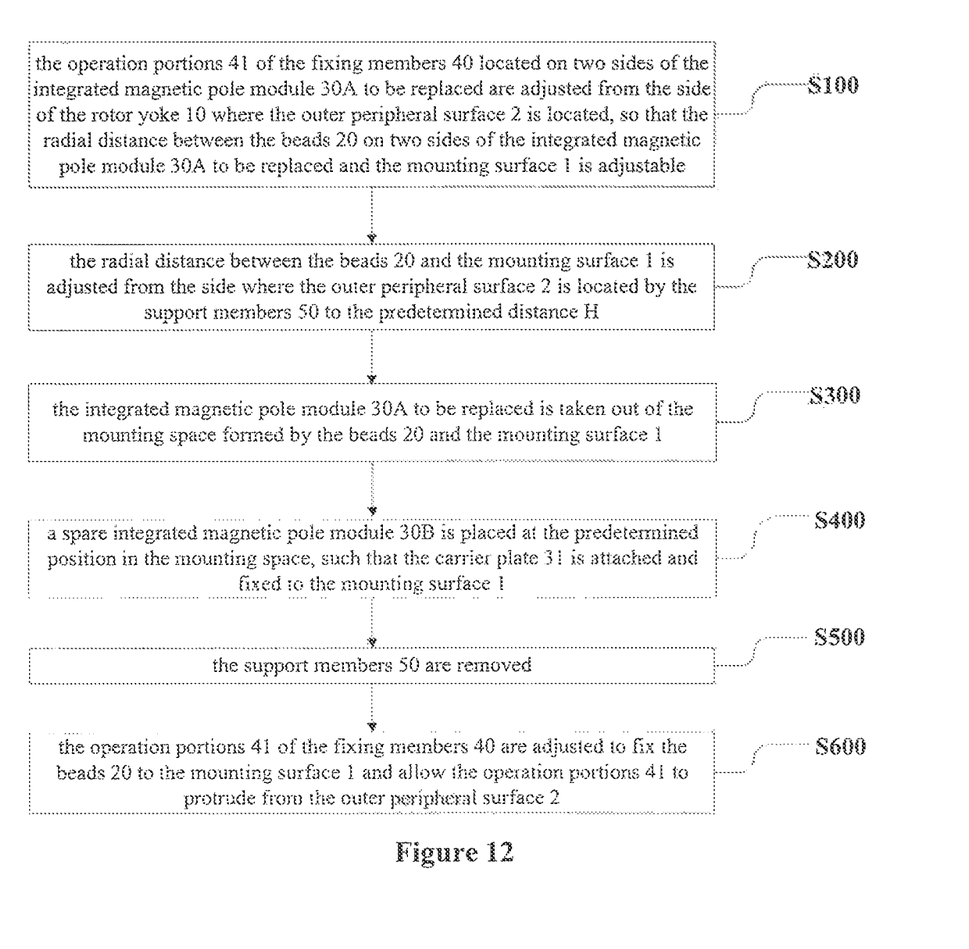
FIG. 12 is a flow chart of a replacement method for integrated magnetic pole modules of a rotor according to an embodiment of the present application.

Referring to FIG. 11 and FIG. 12, according to an embodiment of the present application, a replacement method for integrated magnetic pole modules of a rotor as described above includes the following steps.

In step S100, the operation portions 41 of the fixing members 40 located on two sides of the integrated magnetic pole module 30A to be replaced are adjusted from the side of the rotor yoke 10 where the outer peripheral surface 2 is located, so that the radial distance between the beads 20 on two sides of the integrated magnetic pole module 30A to be replaced and the mounting surface 1 is adjustable.

In step S200, the radial distance between the beads 20 and the mounting surface 1 is adjusted from the side where the outer peripheral surface 2 is located by the support members 50 to the predetermined distance H.

In step S300, the integrated magnetic pole module 30A to be replaced is taken out of the mounting space formed by the beads 20 and the mounting surface 1.

In step S400, a spare integrated magnetic pole module 30B is placed at the predetermined position in the mounting space, such that the carrier plate 31 is attached and fixed to the mounting surface 1.

In step S500, the support members 50 are removed.

In step S600, the operation portions 41 of the fixing members 40 are adjusted to fix the beads 20 to the mounting surface 1 and allow the operation portions 41 to protrude from the outer peripheral surface 2.

In addition, the replacement method for integrated magnetic pole modules of a rotor further includes the following step.

In step S90, a position where the integrated magnetic pole module 30A to be replaced is located on the rotor yoke 10 is determined.

In an actual engineering, generally, the generator is checked regularly by the maintenance worker to determine whether there is a fault; a tool such as, but not limited to, an endoscope may be inserted into the generator to check whether there is a malfunctioning permanent magnet 32, and to determine a position of the integrated magnetic pole module 30A to which the malfunctioning permanent magnet 32 belongs on the rotor yoke 10; and the integrated magnetic pole module 30A to be replaced is replaced with the spare integrated magnetic pole module 30B by the above replacement method.

According to the replacement method for integrated magnetic pole modules of a rotor provided by the embodiments of the present application, by providing fixing members 40 having operation portions 41, the fixing members 40 can be loosened from the side of the rotor yoke 10 where the outer peripheral surface 2 is located, so that the radial distance between the beads 20 and the mounting surface 1 of the rotor yoke 10 is adjustable, and by providing the support members 50, the radial distance between each bead 20 and the mounting surface 1 is maintained at the predetermined distance H, so that the integrated magnetic pole module 30A to be replaced can be quickly replaced with the spare integrated magnetic pole module 30B in the mounting space formed by the beads 20 and the mounting surface 1 without disassembling the stator and the rotor of the generator, thereby realizing the online replacement of the integrated magnetic pole module.

In addition, the embodiments of the present application further provide a generator which includes a stator and any one of the foregoing rotors arranged around an outer peripheral surface of the stator.

Further, the integrated magnetic pole module and the generator according to the above exemplary embodiments can be applied to various devices that require generators, such as, but not limited to, a wind turbine generator set.

Those skilled in the art should understand that the above-described embodiments are illustrative rather than limiting. Different technical features that appear in different embodiments may be combined to achieve beneficial effects. Other variations to the disclosed embodiments may be understood and implemented by the person skilled in the art upon studying the drawings, the specification, and the claims. In the claims, the term "comprising" does not exclude other means or steps; the indefinite article "a/an" does not exclude a plurality; and the terms "first" and "second" are used to indicate a name and are not intended to signify any particular order. Any reference numerals in the claims should not be construed as limitation to the scope of protection. The functions of various parts appearing in the claims may be implemented by a single hardware or a single software module. The fact that certain technical features appear in different dependent claims does not mean that these technical features cannot be combined to achieve beneficial effects.

The invention claimed is:

1. A rotor arranged around an outer peripheral surface of a stator of a generator, comprising:
a rotor yoke having a mounting surface and an outer peripheral surface which are opposite to each other in a radial direction;
a plurality of beads distributed and spaced apart on the mounting surface along a circumferential direction of the rotor yoke, wherein a radial distance between each of the plurality of beads and the mounting surface is adjustable;
a plurality of integrated magnetic pole modules, each of which is detachably connected between two adjacent beads, and comprises a carrier plate and a plurality of permanent magnets arranged on the carrier plate, wherein the carrier plate is attached to the mounting surface; and
a plurality of fixing members, wherein each of the plurality of beadings is mounted on the mounting surface by the plurality of fixing members, and each of the plurality of fixing members has an operation portion protruding through the outer peripheral surface,
wherein the rotor yoke is provided with a plurality of first through holes arranged in rows and columns;
each of the plurality of beads is provided with a plurality of second through holes along a length extension direction of the bead, each of the plurality of beads is arranged corresponding to a column of the first through holes, and at least a portion of the first through holes corresponds to at least a portion of the second through holes; and
the plurality of fixing members comprises a plurality of rods, wherein the operation portion of each rod passes through the opposite first through hole and second through hole, and has at least two different engaging portions in the radial direction, which allows each of the plurality of beads to be engaged at least on the two engaging portions with respect to the mounting surface,
wherein the rotor yoke is further provided with a plurality of first process through holes arranged at least in columns; and
each of the plurality of bead is provided with at least one second process through hole corresponding to one column of the plurality of first process through holes, and the radial distance between each of the plurality of bead and the mounting surface is adjustable via the plurality of first process through holes and the at least one second process through hole.

2. The rotor according to claim 1, wherein the plurality of first through holes and the plurality of first process through holes on the rotor yoke are threaded through holes;
the plurality of second through holes on the bead are smooth through holes, and the at least one second process through hole is threaded through holes; and
all the rods are bolts.

3. The rotor according to claim 2, wherein the operation portion of each of the bolts is provided with at least one plane parallel to an axial direction of the bolt.

4. A replacement method for integrated magnetic pole modules of a rotor according to claim 2, comprising:
adjusting the operation portions of the fixing members located on two sides of an integrated magnetic pole module to be replaced from a side of the rotor yoke where the outer peripheral surface is located, which allows the radial distance between the beads on two sides of the integrated magnetic pole module to be replaced and the mounting surface to be adjustable;

adjusting the radial distance between the beads and the mounting surface from the side where the outer peripheral surface is located by the support members to the predetermined distance;

taking the integrated magnetic pole module to be replaced out of the mounting space formed by the beads and the mounting surface;

placing a spare integrated magnetic pole module at a predetermined position in the mounting space, and attaching and fixing the carrier plate to the mounting surface;

removing the support members; and adjusting the operation portions of the fixing members to fix the beads to the mounting surface and to allow the operation portions to protrude from the outer peripheral surface.

5. The rotor according to claim 1, wherein the rotor yoke has two opposite ends, a first end and a second end, in the axial direction, the first end is provided with an annular projection formed on the mounting surface, and the second end is provided with a threaded hole for fixing; and one end of the carrier plate of the integrated magnetic pole module abuts against the annular projection, and the other end of the carrier plate of the integrated magnetic pole module is provided with a through hole at a position corresponding to the threaded hole for fixing, and a fastener passing through the through hole and the threaded hole for fixing connects the integrated magnetic pole module to the mounting surface in the axial direction.

6. The rotor according to claim 1, wherein the bead is provided with socket portions on two sides of a width of the bead, the carrier plate is provided with plug portions on two sides of a width of the carrier plate, and the integrated magnetic pole module is detachably connected between two adjacent beads by overlap and engagement between the plug portions on the two sides of the carrier plate and the socket portions of the beads.

7. The rotor according to claim 6, wherein a cross section of each of the socket portion in the width direction of the bead itself is of a first step, a cross section of the plug portion in the width direction of the carrier plate itself is of a second step, and the first step and the second step overlap and engage with each other; or, each of the socket portions comprises a first inclined surface arranged along the width direction of the bead itself, the plug portion comprises a second inclined surface arranged along the width direction of the carrier plate itself, and the first inclined surface and the second inclined surface overlap and engage with each other.

8. An assembly method for integrated magnetic pole modules of a rotor according to claim 1, comprising:

arranging the plurality of beads spaced apart onto the mounting surface along the circumferential direction of the rotor yoke, and adjusting the radial distance between each bead and the mounting surface to a predetermined distance by support members, which allows every two adjacent beads and the mounting surface together form a mounting space;

placing each integrated magnetic pole module at a predetermined position in the mounting space, and attaching and fixing the carrier plate to the mounting surface;

adjusting the fixing members to allow the radial distance between each bead and the mounting surface to be maintained at the predetermined distance;

removing the support members; and adjusting the fixing members to fix the beads to the mounting surface, and to allow the operation portions of the fixing members to protrude from the outer peripheral surface.

9. A replacement method for integrated magnetic pole modules of a rotor according to claim 1, comprising:

adjusting the operation portions of the fixing members located on two sides of an integrated magnetic pole module to be replaced from a side of the rotor yoke where the outer peripheral surface is located, which allows the radial distance between the beads on two sides of the integrated magnetic pole module to be replaced and the mounting surface to be adjustable;

adjusting the radial distance between the beads and the mounting surface from the side where the outer peripheral surface is located by the support members to the predetermined distance;

taking the integrated magnetic pole module to be replaced out of the mounting space formed by the beads and the mounting surface;

placing a spare integrated magnetic pole module at a predetermined position in the mounting space, and attaching and fixing the carrier plate to the mounting surface;

removing the support members; and adjusting the operation portions of the fixing members to fix the beads to the mounting surface and to allow the operation portions to protrude from the outer peripheral surface.

10. The replacement method according to claim 9, further comprising:

determining a position where the integrated magnetic pole module to be replaced is located on the rotor yoke.

11. A generator, comprising:

a stator; and a rotor which is arranged around an outer peripheral surface of the stator and is a rotor according to claim 1.

* * * * *